Feb. 19, 1929.

R. F. DANIELS 1,702,817

BRAKE TESTING MACHINE

Filed Feb. 15. 1928

INVENTOR.
Richard F. Daniels.

BY
Townsend, Loftus & Affett
ATTORNEYS.

Feb. 19, 1929.

R. F. DANIELS 1,702,817

BRAKE TESTING MACHINE

Filed Feb. 15, 1928   3 Sheets-Sheet 2

INVENTOR.
Richard F. Daniels.
BY
ATTORNEYS.

Feb. 19, 1929.

R. F. DANIELS 1,702,817

BRAKE TESTING MACHINE

Filed Feb. 15, 1928

INVENTOR.
Richard F. Daniels.
BY
Townsend, Loftus & Affett
ATTORNEYS.

Patented Feb. 19, 1929.

1,702,817

UNITED STATES PATENT OFFICE.

RICHARD F. DANIELS, OF ALAMEDA, CALIFORNIA.

BRAKE-TESTING MACHINE.

Application filed February 15, 1928. Serial No. 254,466.

This invention relates to apparatus for testing the effectiveness or efficiency of automobile brakes.

It is the principal object of the present invention to provide a generally improved apparatus of the character referred to which will positively and accurately indicate the effectiveness or efficiency of automobile brakes.

In carrying out the invention into practice, I provide means adapted to be placed in engagement with an automobile wheel to revolve the same against the action of its brake. This means is driven either manually or otherwise through a flexible driving connection which is adapted to deflect during operation an amount in direct proportion to the torque required to revolve the wheel. I measure this deflection by means of a sensitive device so that even slight variations in resistance offered by the wheel to turning movement will be indicated.

One form which the invention may assume is exemplified in the following description and illustrated by way of example in the accompanying drawings, in which:

Fig. 6 is a fragmentary view in central section through the fluid chamber used in connection with the indicator of the present device.

Figure 1:
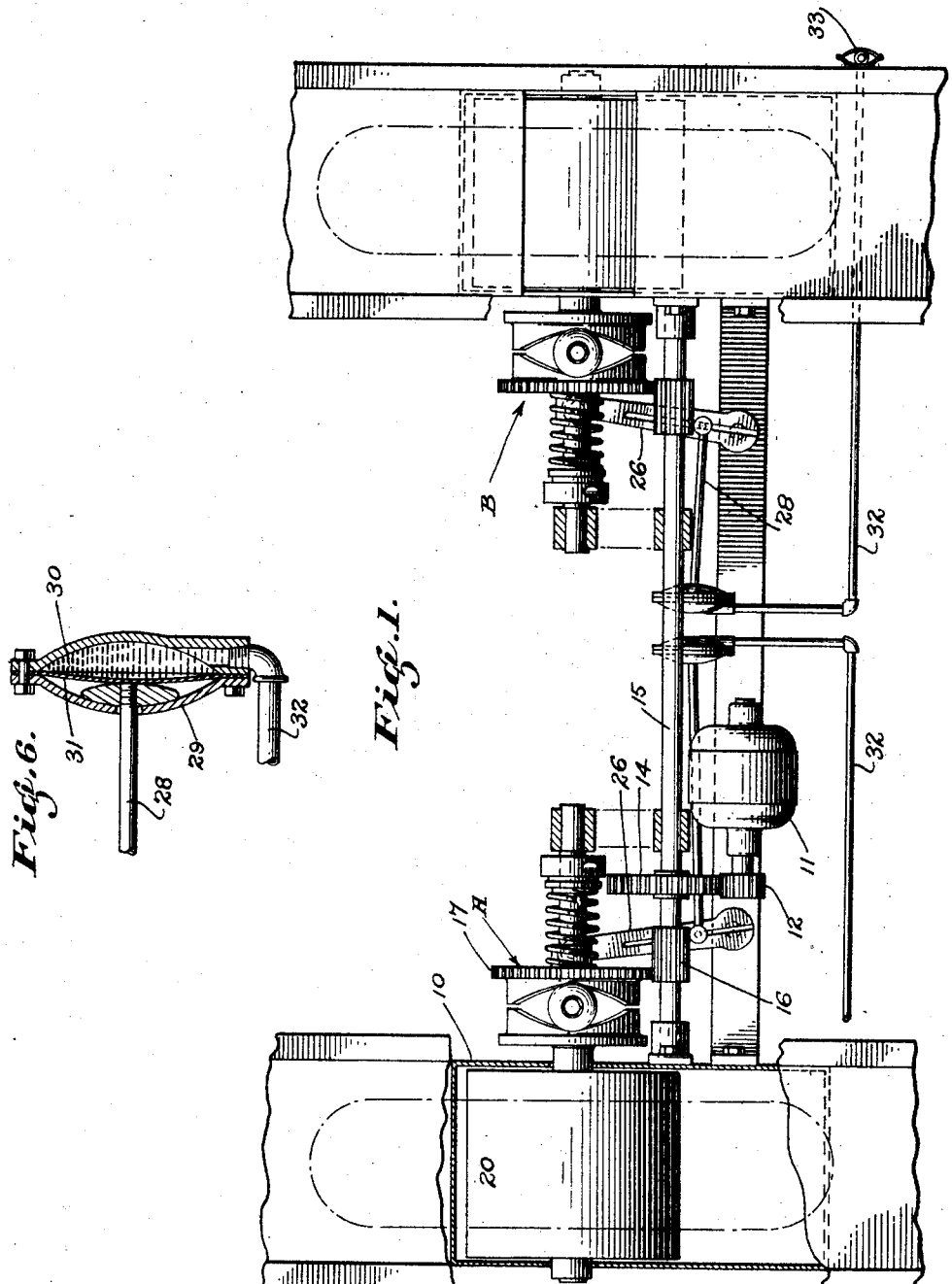
Fig. 1 is a plan view of a brake testing apparatus showing two testing units.
Figure 2:
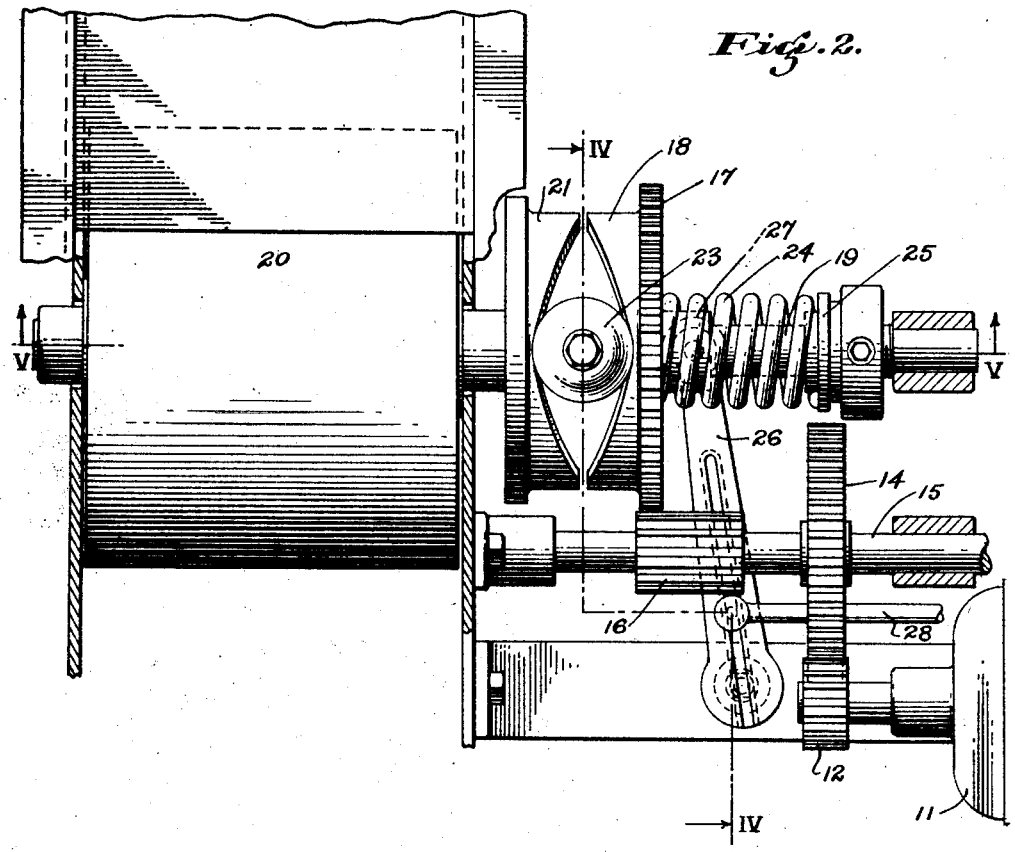
Fig. 2 is a plan view of one of the testing units shown with parts broken away and in section.

Referring more particularly to the accompanying drawings, in Fig. 1 I have shown a testing device for two wheels of an automobile. This testing device includes two testing units A and B one being provided for each wheel. It is to be understood that I may embody my apparatus in a machine for testing all four wheels if desired as it is only necessary to duplicate the apparatus illustrated in Fig. 1 and properly space it therefrom so that all four wheels of a vehicle may be tested simultaneously. However, the present application is particularly concerned with the testing unit employed for each wheel.

Each testing unit comprises a frame 10 which may be of any suitable design and construction. This frame 10 supports an electric motor 11 the shaft of which is fitted with a pinion 12. This pinion is in mesh with a gear 14 keyed or otherwise secured on a countershaft 15. The electric motor 11 and the countershaft 15 in the present instance is common to both the units A and B.

Secured on the countershaft 15 is a pinion 16 which is in mesh with a gear 17 formed on or secured to a cam 18. This cam 18 is rotatably and reciprocably mounted on a shaft 19. This shaft is journalled in suitable bearings and mounted thereon is a wheel 20 which constitutes means for revolving a vehicle wheel. That is, the wheels of the automobile are disposed on the wheels 20 of the different testing units and the vehicle is anchored from movement so that the vehicle wheels may be revolved by the wheels 20 without movement of the automobile.

Figure 3:
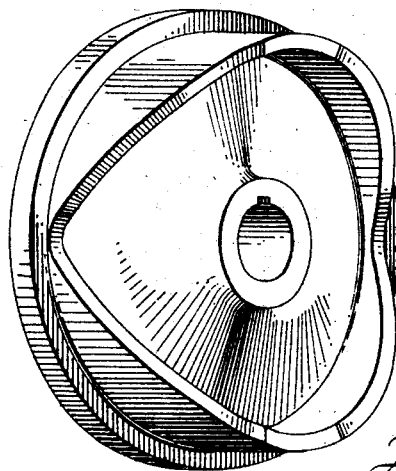
Fig. 3 is a perspective view of one of the cams employed.
Figure 4:
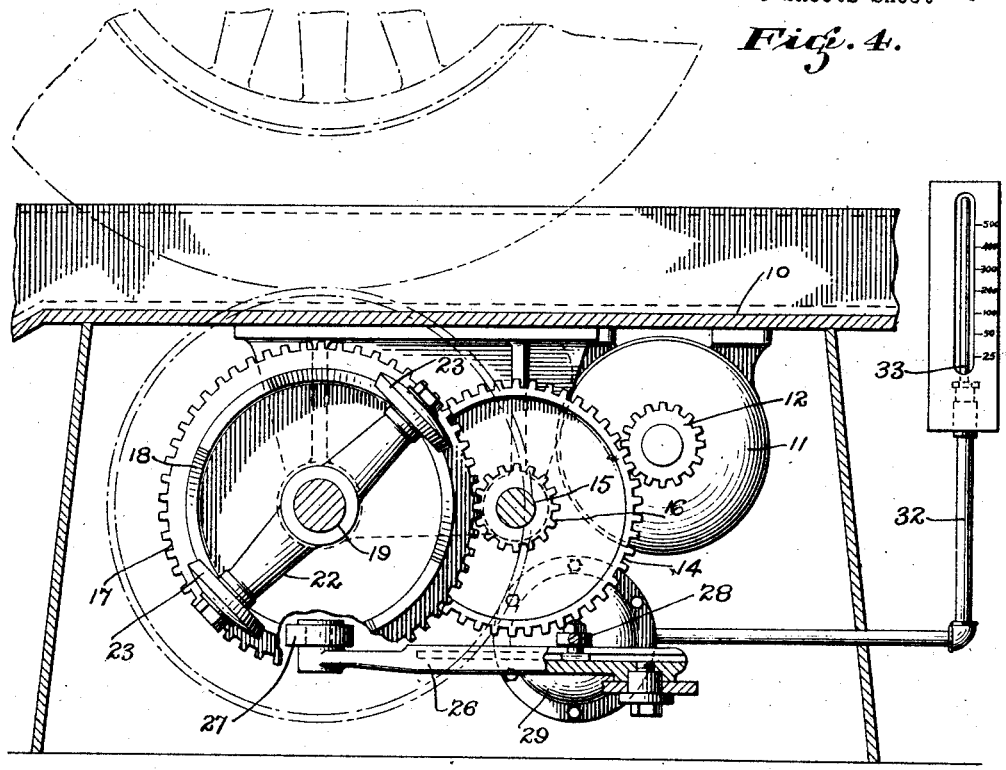
Fig. 4 is a central vertical section through one of the testing units taken on line IV—IV of Fig. 2.
Figure 5:
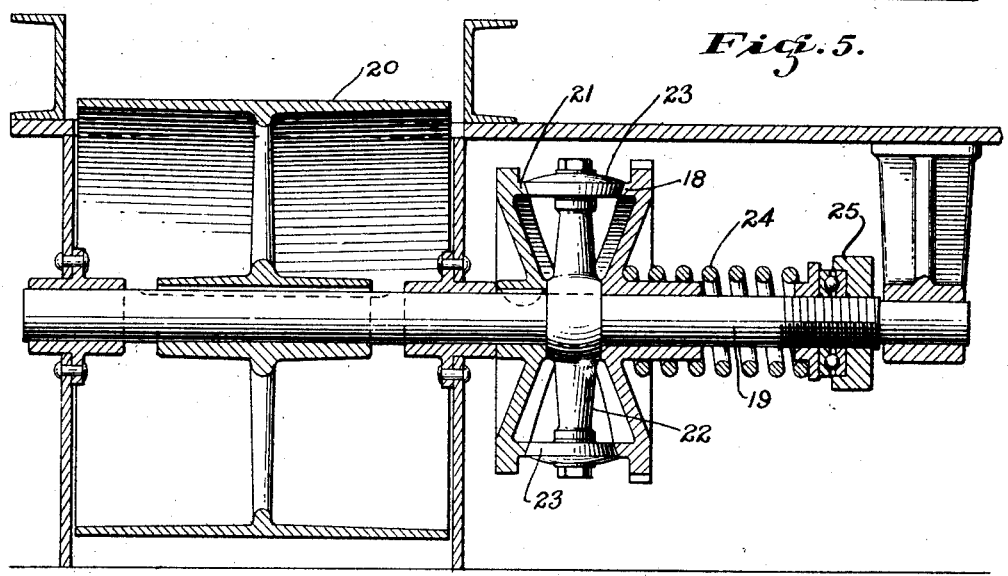
Fig. 5 is a transverse sectional view taken on line V—V of Fig. 2.

Also secured on the shaft 19 is a cam 21 which is identical in construction with the cam 18 with the exception that it is of opposite hand and it is not fitted with a gear. The faces of these two cams are contiguous and are formed in the manner illustrated in Fig. 3. That is, the cams have two high points at diametrically opposed sides and two low points arranged at 180 degrees apart and 90 degrees from the high points of the cams.

Mounted on the shaft 19 between the two cams 18 and 21 is a spindle 22 which is adapted to revolve freely on the shaft 19. At its outer ends this spindle carries rollers 23 engaging the cam faces of the cams 18 and 21. The cam 18 is yieldably urged toward the fixed cam 21 by means of a spring 24 interposed between the cam 18 and a collar 25. This collar is threaded on the shaft 19 so that it may be used to adjust the tension of the spring 24.

It is obvious that when the shaft 19 is driven that the cam 18 will through the medium of the rollers 23 drive the cam 21. If no resistance is encountered to the driving of the shaft 19, the wedging action of the rollers will be sufficient to transmit the drive from cam 18 to cam 21 and the two will revolve in unison, revolving the wheel 20.

However, if resistance is offered to revolving the wheel 20 by the vehicle wheel the cam 18 will advance relative to the cam 21 and the rollers will tend to climb the high points of the cams until the resistance of the spring 24 to the action of the rollers in spreading the cams overcomes the resistance offered to the turning of the wheel 20. When this resistance is overcome a drive will be transmitted through the cams to the wheel 20 and through this wheel to the vehicle wheel to drive the latter against the action of its brake.

It is obvious that such wedging action of the rollers 23 will cause them to travel upwardly toward the high points of the cam and spread the cams apart by axially moving the cam 18 against the resistance of the spring 24. This axial movement of the cam 18 will be in direct proportion to the torque required to overcome the resistance offered by the brake of the vehicle wheel to the turning of the wheel 20.

I intend to measure this axial movement or deflection of the cam 18 and to operate an indicator thereby at an increased ratio to indicate the amount of resistance offered by the brake of the automobile wheel or the torque required to revolve the vehicle wheel against its brake. I accomplish this by providing a pivotal arm 26 having its free end fitted with a roller 27 engaging the outer face of the cam 18, so that axial movement of this cam will be accompanied by swinging movement of the arm. A connecting rod 28 is connected at one end to the arm at a point intermediate the ends of the latter. The other end of the connecting rod 28 extends within a casing 29 which encloses a fluid chamber 30. One wall of this fluid chamber is formed by a flexible diaphragm 31, the outer surface of which is engaged by the end of the connecting rod 28. The fluid chamber 30 is connected by a small conduit 32 to a calibrated gage glass 33.

It is obvious that when the arm 26 is moved by axial movement of the cam 18, the diaphragm 31 will be deflected. This deflection will alter the volume of the chamber and will consequently raise or lower the fluid level on the gage glass 33. As the interior of this gage glass and the conduit 32 is comparatively small, very slight deflection of the diaphragm will be accompanied by a considerable change in the level of the fluid in the gage glass. Thus, I have provided sensitive means operated by the movement of the cam 18 at a greatly increased ratio to indicate the movement of the cam 18. As the movement of this cam is in direct proportion to the torque required to revolve the vehicle wheel, the efficiency of the brake on the wheel will be accurately indicated by the gage 33.

In operation of the device I will describe the operation of but one unit, it being understood that the remaining units operate in an identical manner.

The wheel of the automobile is supported on the wheel 20 of the apparatus and the motor 11 is started. After the motor is started a drive will be transmitted through the cams to the shaft 19 and thence to the wheel 20 which, frictionally engaging the tire of the automobile wheel, will tend to revolve the wheel. The brake of the wheel will offer a resistance to the driving of the wheel.

When the load is imposed the rollers 23 will endeavor to spread the cams 18 and 21 by climbing the rises thereof, consequently moving the cam 18 axially against the action of the spring 24 until the spring resistance is sufficient to overcome the resistance offered to the turning of the shaft 19 by the automobile wheel. Thus, the cam 18 will move axially, which movement will be transmitted to the arm 26 and thence through the connecting rod 28 to the diaphragm 31. This diaphragm will be deflected, decreasing the volume of the chamber 30 and indicating the resistance offered by the automobile wheel to turning or the torque required to revolve the same on the gage 33.

The cam 18 will change its position axially each time the resistance of the vehicle wheel brake changes and such changes will be indicated on the gage.

It is obvious that the device may be operated in either direction as the cams are the same throughout each 180 degrees thereof.

Various adjustments may be obtained, first, by adjusting the tension of the spring 24, and, secondly, by adjusting the point of connection between the connecting rod 28 and the arm 26 so as to either lengthen or shorten the stroke of the connecting rod.

Although I have described the construction and operation of but one unit, it is obvious that a unit may be provided for all four wheels of a vehicle all of which will operate in an identical manner and will indicate individually the resistance of the brake of each vehicle wheel.

From the foregoing it is obvious that I have provided a brake testing apparatus which will be very effective in testing the efficiency of a vehicle brake and which will clearly indicate during its operation any changes in the resistance offered by the vehicle brake. Thus, by watching the gage during the operation of the testing apparatus, the operator may determine whether or not the brake drums are true and also the effectiveness of the brake so that it may be properly adjusted.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A brake testing apparatus comprising wheel turning means adapted to engage the wheel of an automobile to revolve the same, a revoluble member relatively fixed to said wheel turning means, a revoluble member adapted to be driven and capable of yielding axially, means interposed between said members adapted to transmit the drive from the yielding member to the fixed member and to cause said yielding member to yield axially in direct proportion to the resistance offered to turning movement by the wheel, and indicating means operated by the yielding movement of said yieldable member.

2. A brake testing apparatus comprising wheel turning means adapted to engage the wheel of an automobile to revolve the same, a revoluble member relatively fixed to said wheel turning means, a revoluble member adapted to be driven and capable of yielding axially, means interposed between said members adapted to transmit the drive from the yielding member to the fixed member and to cause said yielding member to yield axially in direct proportion to the resistance offered to turning movement by the wheel, and means operated by the yielding movement of the yieldable member at a greatly increased ratio to indicate the yielding movement of the yieldable member.

3. A brake testing apparatus comprising wheel turning means adapted to engage the wheel of an automobile to revolve the same against the action of its brake, a member relatively fixed to the wheel turning means, a yieldable member adapted to be driven, a motor connected to said yieldable member to drive the same, means interposed between the fixed member and the yieldable member to transmit the drive to the fixed member from the yieldable member and causing the yieldable member to yield in direct proportion to the torque required to turn the wheel, and indicating means operated by the yielding movement of said yieldable member.

4. A device for testing automobile brakes comprising wheel turning means adapted to engage the wheel of an automobile to revolve the same, a driving motor, flexible means transmitting the drive from the motor to the wheel turning means, said flexible means being adapted to be deflected a distance in direct proportion to the torque required to turn the wheel, a chamber containing a fluid, a flexible diaphragm forming one wall of said chamber, a calibrated gage glass connected with said chamber and in which the fluid level changes as the volume of the chamber is changed, and means operatively associated with said flexible means and said diaphragm to actuate the latter by the deflection of said flexible means to change the volume of said chamber.

5. A brake testing apparatus comprising wheel turning means, flexible means adapted to be driven and to transmit a drive to the wheel turning means, said flexible means being adapted to deflect an amount in direct proportion to the resistance offered by the wheel to turning, a fluid chamber containing fluid, a gage connected therewith, and means actuated by the deflection of said flexible means to reduce the volume of the fluid chamber to cause the fluid to rise in the gage and indicate the deflection of said flexible means.

6. A brake testing apparatus comprising wheel turning means adapted to engage the wheel of an automobile to revolve the same, a revoluble member relatively fixed to said wheel turning means, a revoluble member adapted to be driven and capable of yielding axially, means interposed between said members adapted to transmit the drive from the yielding member to the fixed member and to cause said yielding member to yield axially in direct proportion to the resistance offered to turning movement by the wheel, a chamber containing a fluid, a flexible diaphragm forming one wall of said chamber, a calibrated gage glass connected with said chamber and in which the fluid level changes as the volume of the chamber is changed, and means operatively associated with said yieldable member and said diaphragm to change the volume of the chamber by yielding movement of said yieldable member.

7. A brake testing apparatus comprising wheel turning means adapted to engage an automobile wheel to revolve the same against the action of its brake, a revolving member relatively fixed to said wheel turning means, a second revolving member arranged in axial alignment with the first one to revolve concentrically therewith, means for revolving the second member, means interposed between said members adapted to permit a limited amount of relative rotation therebteween but to transmit a drive from the second member to the first member, means causing axial movement of said second member upon relative rotation between said members, means resisting such relative rotation but permitting same in direct proportion to the resistance offered to turning by the wheel, and means for indicating the axial movement of said second member.

8. A brake testing apparatus comprising wheel turning means adapted to engage an automobile wheel to revolve the same against the action of its brake, a revolving member relatively fixed to said wheel turning means, a second revolving member arranged in axial alignment with the first one to revolve concentrically therewith, means for revolving the second member, means interposed between said members adapted to permit a limited amount of relative rotation therebetween but to transmit a drive from the second member to the first member, means causing axial movement of said second member upon relative rotation between said members, means resisting such relative rotation but permitting same in direct proportion to the resistance offered to turning by the wheel, and means operated by the axial movement of the second member at a greatly increased ratio to indicate the axial movement of said second member.

9. A brake testing apparatus comprising a shaft, a revolving member fixed on said shaft to engage the wheel of an automobile to revolve the same against the action of its brake, a cam fixed on said shaft, a second cam rotatably and slidably mounted on said shaft contiguous to the first cam, means for revolving the second cam, said cams having contiguous cam faces, means carried by the shaft and interposed between said cam faces adapted to permit a limited amount of relative rotation between the cams but to transmit a drive from the second cam to the first cam, said cam faces being formed to cause the second cam to move axially upon relative rotation, means yieldably resisting such axial movement of the second cam whereby relative movement of the cams and axial movement of the second cam will occur in direct proportion to the resistance offered to turning by the wheel, and means for indicating the axial movement of said second cam.

10. A brake testing apparatus comprising a shaft, a revolving member fixed on said shaft to engage the wheel of an automobile to revolve the same against the action of its brake, a cam fixed on said shaft, a second cam rotatably and slidably mounted on said shaft contiguous to the first cam, means for revolving the second cam, said cams having contiguous cam faces, means carried by the shaft and interposed between said cam faces adapted to permit a limited amount of relative rotation between the cams but to transmit a drive from the second cam to the first cam, said cam faces being formed to cause the second cam to move axially upon relative rotation, means yieldably resisting such axial movement of the second cam whereby relative movement of the cams and axial movement of the second cam will occur in direct proportion to the resistance offered to turning by the wheel, a chamber containing a fluid, a flexible diaphragm forming one wall of said chamber, a calibrated gage glass connected with said chamber and in which the fluid level changes as the volume of the chamber is changed, and means operatively associated with said second cam and said diaphragm to actuate the latter by the movement of said second cam.

11. A brake testing apparatus comprising a shaft, a revolving member fixed on said shaft to engage the wheel of an automobile to revolve the same against the action of its brake, a cam fixed on said shaft, a second cam rotatably and slidably mounted on said shaft contiguous to the first cam, means for revolving the second cam, said cams having contiguous cam faces, means carried by the shaft and interposed between said cam faces adapted to permit a limited amount of relative rotation between the cams but to transmit a drive from the second cam to the first cam, said cam faces being formed to cause the second cam to move axially upon relative rotation, means yieldably resisting such axial movement of the second cam whereby relative movement of the cams and axial movement of the second cam will occur in direct proportion to the resistance offered to turning by the wheel, and means operated by the axial movement of said second cam at a greatly increased ratio to indicate the axial movement of the second cam.

RICHARD F. DANIELS.